United States Patent
Donoho et al.

(10) Patent No.: US 6,409,222 B1
(45) Date of Patent: Jun. 25, 2002

(54) TORQUE CONFIRMATION FITTING

(75) Inventors: James Donoho, Golden Valley; Michael Stoick, Prior Lake; Eric Soderstrom, Lauderdale, all of MN (US)

(73) Assignee: Fluroware, Inc., Chaska, MN (US)

( * ) Notice: Subject to any disclaimer, the term of this patent is extended or adjusted under 35 U.S.C. 154(b) by 0 days.

(21) Appl. No.: 09/590,544

(22) Filed: Jun. 8, 2000

(51) Int. Cl.$^7$ .................. F16L 35/00; F16L 55/00
(52) U.S. Cl. .............. 285/93; 285/322; 285/334.5; 411/14
(58) Field of Search ................ 285/93, 322, 334.5; 411/13, 14

(56) References Cited

U.S. PATENT DOCUMENTS

| | | | |
|---|---|---|---|
| 431,816 A | 7/1890 | Lomasney | |
| 771,682 A | 10/1904 | Sussman | |
| 1,058,542 A | 4/1913 | Brown | |
| 2,035,978 A | 3/1936 | Parker | 285/90 |
| 2,123,999 A | 7/1938 | Lauer | 285/86 |
| 2,328,469 A | 8/1943 | Laffly | 285/86 |
| 2,547,889 A | 4/1951 | Richardson | 285/86 |
| 2,641,489 A | 6/1953 | Hedberg, Jr. | 285/106 |
| 2,952,481 A | 9/1960 | Weatherhead, Jr. | 285/116 |
| 3,258,279 A | 6/1966 | Johnsen | 285/110 |
| 3,294,425 A | 12/1966 | Franck | 285/334.5 |
| 3,294,426 A | 12/1966 | Lyon | 285/334.5 |
| 3,304,827 A * | 2/1967 | Bush | 411/13 |
| 3,479,058 A | 11/1969 | Chandler | 285/16 |
| 3,591,205 A * | 7/1971 | Hamburg | 285/93 X |
| 3,615,160 A | 10/1971 | Feather | 285/250 |
| 3,762,059 A * | 10/1973 | Dawson | 285/93 X |
| 4,076,280 A | 2/1978 | Young | 285/39 |
| 4,133,565 A | 1/1979 | Shutt | 285/334.5 |
| 4,585,255 A * | 4/1986 | Ridenour | 285/93 |
| 5,217,261 A | 6/1993 | DeWitt et al. | 285/332.2 |
| 5,261,442 A | 11/1993 | Kingsford et al. | 137/312 |
| 5,340,121 A | 8/1994 | Lewis et al. | 277/43 |
| 5,343,738 A | 9/1994 | Skaggs | 73/40.5 |
| 5,439,259 A | 8/1995 | Taga et al. | 285/334.5 |
| 5,476,004 A | 12/1995 | Kingsford et al. | 73/40 |
| 5,498,036 A | 3/1996 | Kingsford | 285/138 |
| 5,511,797 A | 4/1996 | Nikirk et al. | 277/204 |
| 5,645,301 A | 7/1997 | Kingsford et al. | 285/14 |
| 5,652,391 A | 7/1997 | Kingsford et al. | 73/706 |
| 5,746,555 A * | 5/1998 | McEvoy | 411/14 |
| 6,179,348 B1 | 1/2001 | Okamoto | 285/334.5 |

FOREIGN PATENT DOCUMENTS

| | | |
|---|---|---|
| CH | 163639 | 11/1933 |
| DE | 821 745 | 11/1951 |
| FR | 2 385 969 | 12/1978 |
| GB | 955600 | 4/1964 |
| JP | 09229258 | 9/1997 |

* cited by examiner

*Primary Examiner*—Neill Wilson
(74) *Attorney, Agent, or Firm*—Patterson, Thuente, Skaar & Christensen, P.A.

(57) ABSTRACT

The torque confirmation fitting is used for coupling one section of tubing to another and includes a fitting body, a fitting nut, and a torque confirmation portion. The fitting body has a nose section that supports an end of one of the sections of tubing. The torque confirmation portion has a collar portion and one or more prongs. The fitting nut is operably joinable to the fitting body and engageable with the torque confirmation portion. To operate, the non-supported end of the tubing is inserted through the torque confirmation portion and the fitting nut. The fitting nut is then joined to the fitting body and in doing so engages the torque confirmation portion. The continued joining of the fitting nut to the fitting body causes the prong of the torque confirmation portion to provide a visual indication that the fitting nut has been sufficiently, tightly joined to the fitting body.

20 Claims, 3 Drawing Sheets

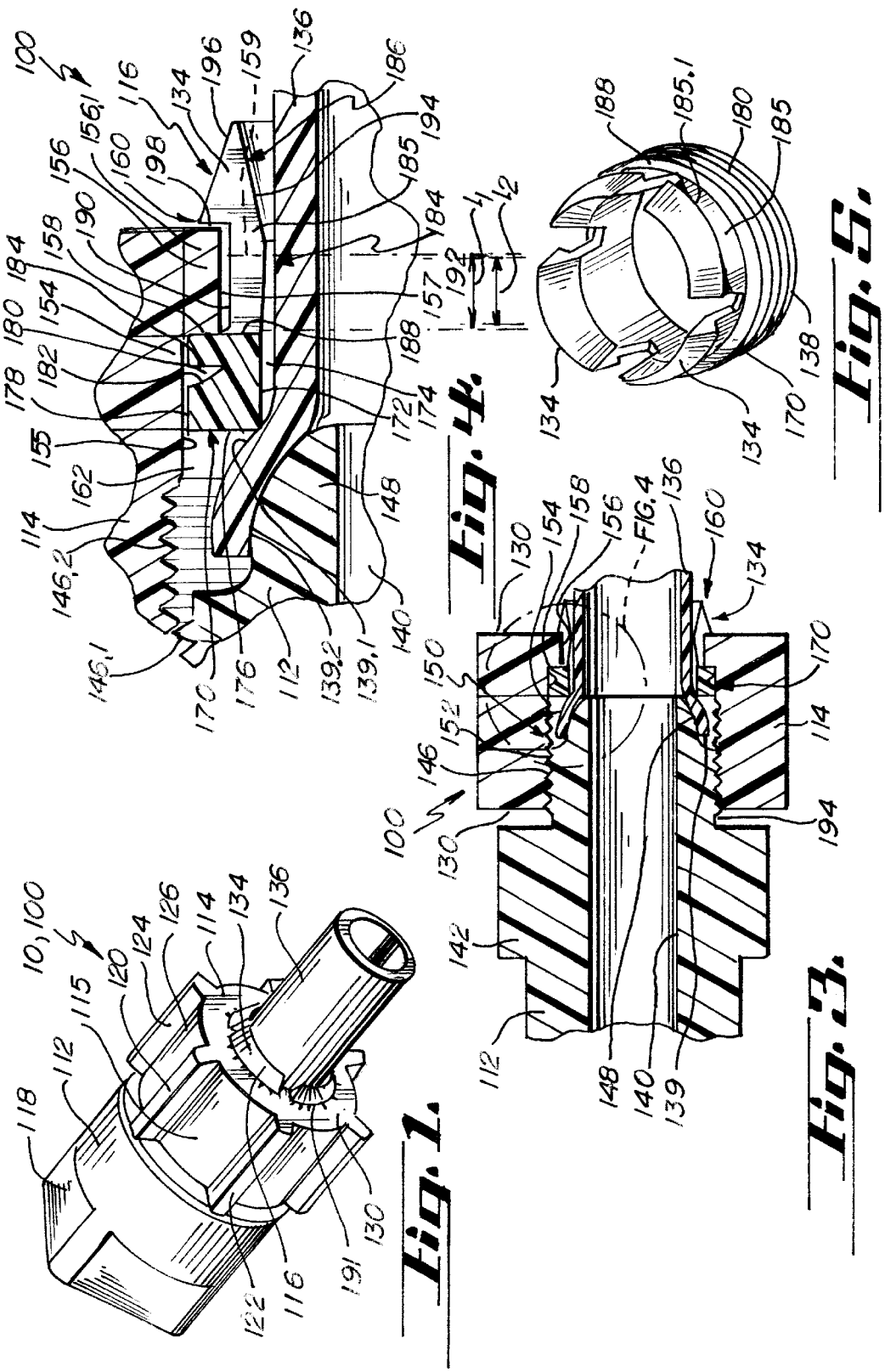

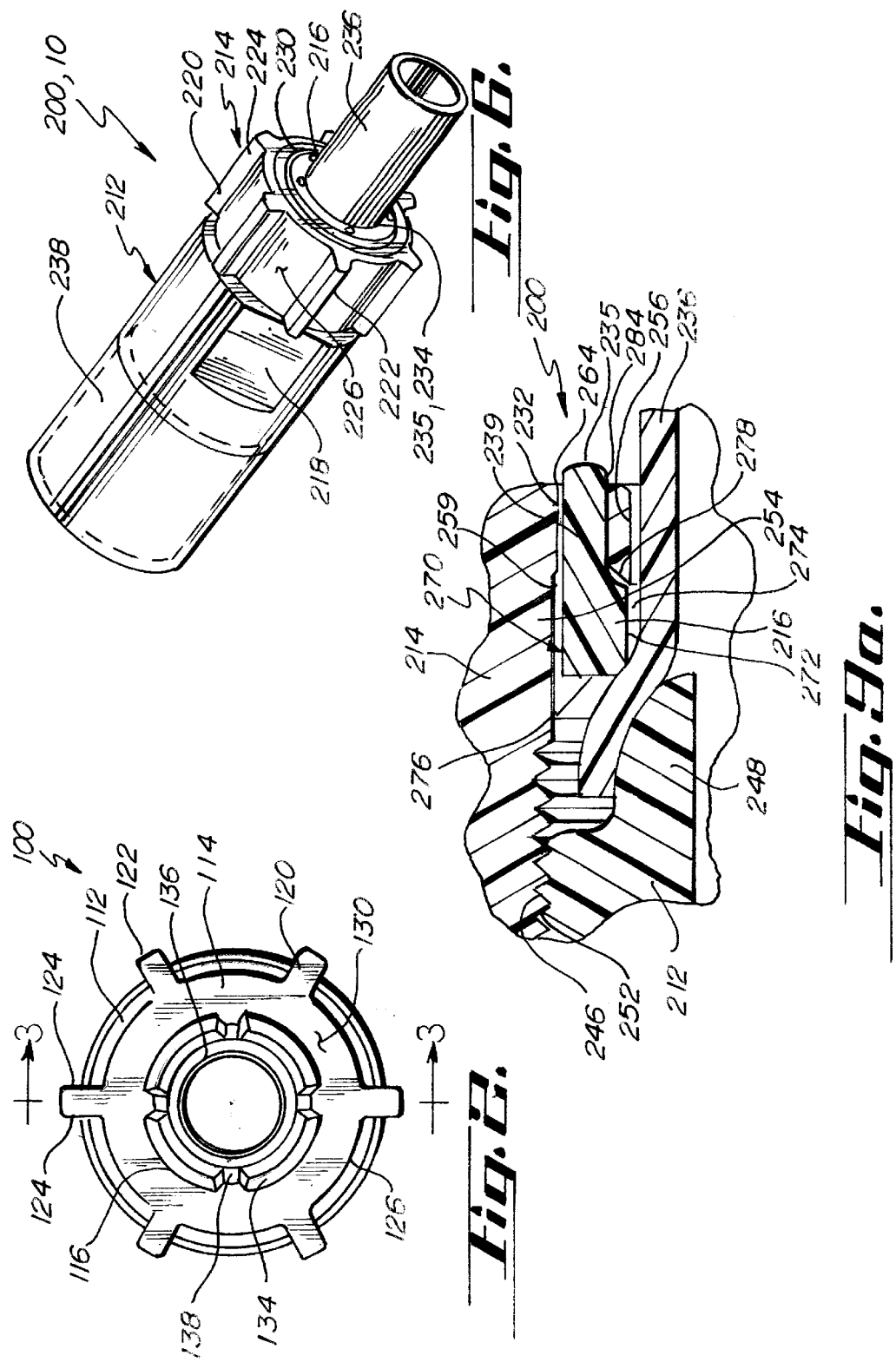

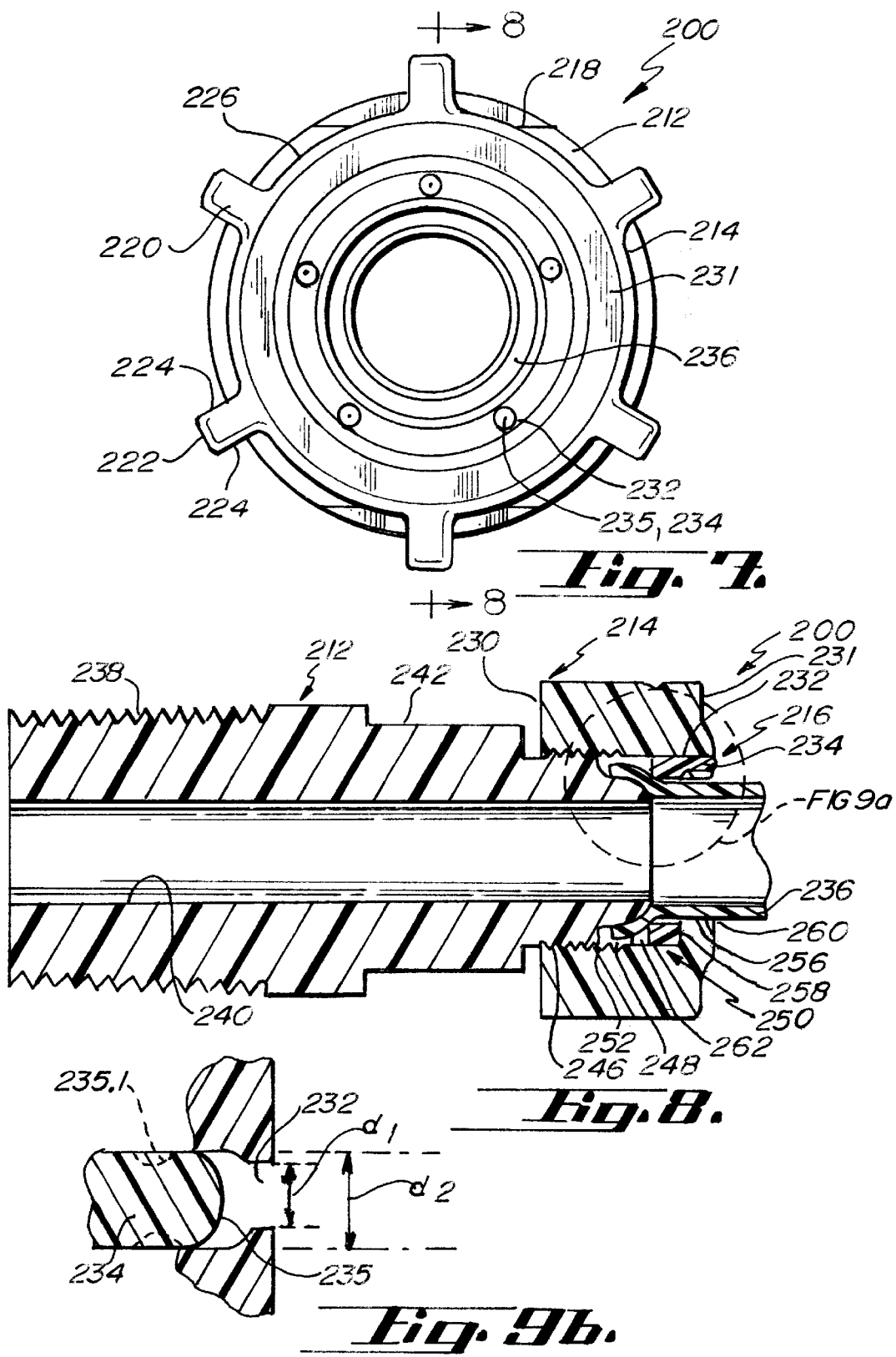

TORQUE CONFIRMATION FITTING

FIELD OF THE INVENTION

The present invention relates to plastic fittings for joining sections of plastic tubing, and, more particularly, to plastic fittings that provide an indication of achieving a certain torque level upon the tightening of the fitting.

BACKGROUND OF THE INVENTION

Numerous industries use metallic tubes and fittings of copper, stainless steel, and steel where connection of high strength and integrity are needed. Metallic plumbing is very suitable in many applications. However, in certain industries, the fluids conveyed may attack metal components and the metal can contaminate the conveyed fluids, i.e., the semiconductor processing industry. Highly inert fluoropolymers may be utilized for the fittings, tubing, and components in such applications, for example, polytetrafluoroethylene (PTFE), and perfluoroalkoloxy (PFA). To maintain a clean and non-hazardous environment, it is essential that the fittings provided for coupling to sections of tubing are not easily unintentionally disconnected and that the tubing/fitting interface maintains its integrity even under mechanical stress. Various types of fittings are known in the art for these purposes.

One standard type of fitting, known as a FLARETEK® fitting, available from the assignee of this application, provides for a fitting body, with an elongate nose with a tapered or rounded tip, and a fitting nut that is attachable thereto. A section of tubing is placed with a nut thereon in engagement with the elongate nose section and the fitting nut is rotated and drawn onto the fitting body, pinching the flared tubing end between the nut and the fitting body. Although fluoropolymer fittings are very robust and have excellent performance characteristics, for many applications they are not as hard as traditional metal fittings and not as common. Thus, particularly for an infrequent user, providing the proper tightening torque is problematic. Over tightening of the fitting nut to the fitting body may damage the fitting nut, tubing, and/or fitting body. For example, threads may be stripped under substantially less torque than in similarly sized metal fittings. The damage may not be detected until materials are flowing through the various tubing sections and a potentially hazardous leak occurs. Under torqueing can fail to provide an adequate fluid seal and mechanical connection.

Thus, there is a need for a fluid flow fitting that provides a fitting assembler with notification that the fitting nut has been sufficiently tightened so that an optimum seal and mechanical connection has been created between fitting body, tubing end, and fitting nut. This notification may be visual, audible, and/or by touch means providing an instant and easily identifiable warning.

SUMMARY OF THE INVENTION

The needs described above are met by the torque confirmation fitting of the present invention. The torque confirmation fitting is used for coupling to a tubing end having a fluid flow duct and generally includes a fitting body, a fitting nut, and a torque confirmation means. In a preferred embodiment, the fitting body has a nose section that receives a flared end of the tubing. The torque confirmation means has a collar portion and one or more prongs. The fitting nut is rotatably joinable to the fitting body and cooperates with the torque confirmation portion. The end of the tubing with the nut and the torque confirmation thereon is engaged with the fitting body. The fitting nut is then rotatably joined to the fitting body and in doing so engages the torque confirmation portion. The continued tightening of the fitting nut to the fitting body, in the preferred embodiments, causes the prong of the torque confirmation portion to provide a visual indication that the fitting nut has been sufficiently and/or optimally tightened to the fitting body.

BRIEF DESCRIPTION OF THE DRAWINGS

FIG. 1 is a perspective view of a torque confirmation fitting of the present invention.

FIG. 2 is an end view of the torque confirmation fitting of FIG. 1.

FIG. 3 is a cross-sectional view of the torque confirmation fitting taken along line 3—3 of FIG. 2.

FIG. 4 is a detailed cross-sectional view of the torque confirmation fitting, indicated as detail area B on FIG. 3.

FIG. 5 is a perspective view of a torque confirmation portion of the present invention.

FIG. 6 is a perspective view of an alternative embodiment of the torque confirmation fitting of the present invention.

FIG. 7 is an view of the torque confirmation fitting of FIG. 6.

FIG. 8 is a cross-sectional view of the torque confirmation fitting taken along line 8—8 of FIG. 7.

FIG. 9a is a detailed cross-sectional view of the torque confirmation fitting, indicated as detail B on FIG. 7.

FIG. 9b is detailed cross-sectional view of the torque indicating elements and torque indicator windows.

DETAILED DESCRIPTION OF THE PREFERRED EMBODIMENTS

Each embodiment of the torque confirmation fittings of the present invention, described herein, provides for quick assembly of the fitting to tubing end portion and provides a verification of proper tightening of the fitting. The tubing end portion may be part of a section of tubing or may be a portion of a component such as valve, filter, pump, another fitting or other fluid handling component.

A first embodiment 100 of the torque confirmation fitting 10 is depicted in FIGS. 1–4. As shown, torque confirmation fitting 10 generally comprises a fitting body, or first coupling means 112, a fitting nut, or second coupling means, 114 and torque confirmation portion 116. Referring specifically to FIGS. 1 and 2, fitting nut 114 and torque confirmation portion 116 are shown secured to fitting body 112. Those exterior portions of fitting nut 114, torque confirmation portion 116, and fitting body 112 not concealed by the securement of fitting nut 114 and torque confirmation portion 116 to fitting body 112 may be appreciated herewith. Specifically, the non-concealed portion of fitting body 112 is generally cylindrical in shape and preferably incorporates one or more planar surfaces 118 for easier grasping of fitting body 112 during assembly.

The non-concealed portion of the exterior of fitting nut 114 has a generally cylindrical body 115 with a plurality of winged extensions 120, facilitate grasping and turning of fitting nut 114 during assembly of torque confirmation fitting 10. Each winged extension 120 generally comprises an enlongate, substantially flat top face 122 and a pair of elongate, substantially parallel and planar side faces 124 that extend substantially perpendicularly from the top face 122. Further defining the exterior of fitting nut 114 are a plurality of elongate separator faces 126, which are positioned between opposite side faces 124 of adjacent winged extensions 120, and a pair of substantially parallel end faces 130.

The non-concealed portion of torque confirmation portion 116 is defined by a plurality of prongs, or projecting means, 134 which extend beyond one of end faces 130 and surround a section of tubing 136 secured therein. Each prong 134 is separated from the other by a spacer portion 138 of torque confirmation portion 116.

Referring now to FIGS. 3, 4, and 5, cross-sectional views of embodiment 100 of torque confirmation fitting 10 with the tubing end 139 secured therein are depicted. The cross-sectional views of FIGS. 3 and 4 help to further define those portions of fitting body 112, fitting nut 114, and torque confirmation portion 116 concealed in FIGS. 1 and 2, as well as the interior configuration of fitting body 112, fitting nut 114 and torque confirmation portion 116. As shown, fitting body 112 is preferably of a unitary configuration having a central bore 140 extending therethrough. The unitary configuration of fitting body 112 generally includes an outer ring portion 142, an annular recessed portion 144 proximate outer ring portion 142, a threaded exterior surface portion 146 proximate annular recessed portion 144, and a recessed, tapered nose section 148, proximate threaded exterior surface portion 146 and surrounding central bore 140.

Fitting nut 114, like fitting body 112, is also preferably of a unitary configuration, and incorporates an inner nut portion 150. Inner nut portion 150 of fitting nut 114 is preferably defined by a lower, threaded inner surface portion 152, wherein the threads of threaded inner surface portion 152 are designed to interface with the threads of threaded exterior surface portion 146 of fitting body 112. Inner fitting portion 150 is further preferably defined by an intermediate circumferential wall portion 154 and a distal circumferential wall portion 156, both of which define bores 155 and 157, respectively. Intermediate wall portion 154 and circumferential outer wall portion 156 are joined by a radial extender section 158. The gap between the bore 157 and the tubing define an indicator window 159 indicated by dashed lines.

Referring to FIGS. 3, 4, and 5, torque confirmation portion 116 includes a collar portion 170 and plurality of torque indicating elements configured as prongs 134, which are preferably integral with collar portion 170. Collar portion 170 is preferably defined by a substantially cylindrical, lower face 172 may define an annular space 174 extending therethrough. Collar portion 170 is further preferably defined by a pair of substantially parallel radial side walls 176, which extend perpendicularly between inner surface/bore 172 and an outer surface 178. Substantially cylindrical upper face 178 is interrupted by a notch 180. Notch 180 is defined by a first surface 182 and a second surface 184 that are joined to create a triangularly shaped recess. Notch 180 enables better flexing of collar portion 170 as prongs 134 are pressed radially inward when being inserted through fitting nut 114.

Each prong 134 of torque confirmation portion 116 is preferably defined by a proximal portion 184 with a substantially, rectangularly-shaped cross-section, a shank portion 185, a distal portion 186 with a substantially triangular cross-section and an annular recess 185.1. Proximal portion 184 includes a radial face 188 on collar portion 170 as well as an outer surface 190 and a inner surface 192. Distal portion 186 includes a inner surface 194 that extends angularly, e.g., 30 degrees, upward from inner face 192. Distal portion 186 further includes an outer surface 196 that extends angularly, e.g., 50 degrees, between an extender section 198 and lower face 194.

In securing embodiment 100 of torque confirmation fitting 10 to tubing 136, the pre-flared end 139 of tubing 136 is oriented confronting tapered nose section 148 of fitting body 112 and is placed thereon typically with the nut and torque confirmation portion 116 positioned on the tubing 136 slightly offset from the tubing end 139. Torque confirmation portion 116 is then moved proximate the flared portion of tubing 136. The fitting nut 114 with the torque confirmation portion 116 is slid towards fitting body 112 until threaded side portion 146 of fitting body 112 engages with fitting nut 114. Fitting nut 114 is manually rotated such that the threads 146.1 of fitting body 112 and threads 146.2 of the fitting nut 114 act to draw fitting nut 114 axially towards outer ring portion 142 of fitting body 112.

As fitting nut 114 is axially drawn towards outer ring portion 142, prongs 134 of torque confirmation portion 116 wedged under bore 157 and are flexed slightly inward and radially compressed by inner fitting portion 150 of fitting nut 114, the flexing ability enhanced by virtue of notch 180, and are edged closer to the distal end faces 130. Simultaneously, collar 170 of torque confirmation portion 116 is acting to pinch the pre-flared end of tubing 136 to tapered nose section 148 of fitting body 112. At a predetermined position of the fitting nut 114 on the fitting body which corresponds to a specific torque level, the drawing of fitting nut 114 towards fitting body 112 causes upper wall portion 156 of fitting nut 114 to push past the prongs whereby the prongs 134 snap on to flex radially outward at distal end face 130. The outward flexing of prongs 134, in a preferred embodiment, make a snapping sound providing an audible indication to the user that the proper torque of fitting nut 114 to fitting body 112 has been achieved. The snapping may be sensed by touch particularly where the nut is being manually tightened by hand or even where a wrench type tool is utilized. Moreover, the extension of the distal portion 186 of the torque confirmation portion through the indicator window 159 provides visual indication of proper positioning of the nut and proper torque. Further, the outward flexing of prongs 134 acts to substantially lock fitting nut 114 into position. The torque indicating elements thus are locking members. Further, the upward flexing, the locking, provides the user with notice that fitting nut 114 has been sufficiently tightened to fitting body 112 such that an adequate or optimal seal has been created between tapered nose section 148 of fitting body 112 and the pre-flared end of tubing 136 and collar 170 of torque confirmation portion 116. Specifically, the collar 170 is axially loaded and compressed, said compression facilitated by notch 180, and the shoulder 139.1 of the flared end is axially compressed. The angle or taper of the shoulder 139.1 and nose section 148 provides a component of radial compression at the seal interface 139.2. Thus, torque confirmation portion 116 and the window 159 provide means for indicating proper torque of the nut.

Referring to FIG. 1, structure on the prongs, such as on the inward face 193 of the distal portion of the torque confirmation portion can engage with structure 191 on the nut, for example, a multiplicity of grooves on the distal end face to securely lock the nut in place on the fitting at the appropriate position and/or optimal tightening level.

The predetermined amount of torque at which the torque indicating elements 134 provide indication, i.e. snap out, can be adjusted by varying the configuration of torque confirmation portion. Distal circumferential wall portion 156 define an annular inwardly extending collar 156.1 which has a length $l_1$. The torque confirmation portion 134 has an annular recess 185.1 which has a length $l_2$. $l_1$ may be sized to be slightly greater than $l_2$ such that the collar portion must be axially compressed to allow the annular recess 185.1 to fully engage the annular inwardly extending collar 156.1. Such compression is controlled by the size and positioning of the notch 180. Thus by providing alternate collars, that have different recess lengths $l_1$ and different collar 170 configurations, the predetermined torque can be controlled.

An alternative embodiment 200 of torque confirmation fitting 10 is depicted in FIGS. 6, 7, 8, 9a, 9b. As shown, torque confirmation fitting 10 generally comprises a fitting body (or first coupling means) 212, a fitting nut (or second coupling means) 214 and a torque confirmation portion 216. Referring specifically to FIGS. 5 and 6, fitting nut 214 and torque confirmation portion 216 are shown secured to fitting body 212. Those exterior portions of fitting nut 214, torque confirmation portion 216, and fitting body 212 not concealed by securement of fitting nut 214 and torque confirmation portion 216 to fitting body 212 may be appreciated herewith. Specifically, the non-concealed portion of fitting body 212 is generally cylindrical in shape and preferably incorporates one or more planar surfaces 218 for easier grasping of fitting body 212 during assembly.

The non-concealed portion of the exterior of fitting nut 214 is also generally cylindrical in shape but is provided with a plurality of winged extensions 220, which provide for easier grasping and turning of fitting nut 214 during assembly of torque confirmation fitting 10. Each winged extension generally comprises an elongate, substantially planar top face 222 and a pair of elongate, substantially parallel and planar side faces 224 that extend substantially perpendicularly from planar top face 222. Further defining the exterior of fitting nut 214 are a plurality of elongate separator faces 226, which are positioned between opposite side faces 224 of adjacent winged extensions 220, and a pair of substantially parallel end faces 230, 231. The distal end face 231 preferably includes a plurality of indicator windows configured as apertures 232 that are designed to receive torque indicating elements, configured as prongs, or projecting means, 234 of torque confirmation portion 216; only the rounded tips 235 of prongs 234 are visible in FIGS. 1 and 2. A section of smaller diameter tubing 236 is shown extending from fitting nut 214 while a section of larger diameter tubing 237 is shown by hidden lines within fitting body 212.

Referring now to FIGS. 8 and 9, cross-sectional views of embodiment 200 of torque confirmation fitting 10 are depicted. The cross-sectional views of FIGS. 7 and 8 help to further define those portions of fitting body 212, fitting nut 214, and torque confirmation device 216 concealed in FIGS. 5 and 6, as well as the interior configurations of fitting body 212, fitting nut 214, and torque confirmation portion 216. As shown, fitting body 212 is preferably of an integral configuration having a central bore 240 extending therethrough. The end of the fitting body opposite the nut may have threads, other connection means, or be attached to or integral with devices such as valves or other fluid handling components or equipment. The integral configuration of fitting body 212 generally includes an outer ring portion 242, which has grasping surfaces 218 for a wrench. The ring portion can also serve as a stopping ring preventing over travel of fitting nut 214, a threaded side portion 246 proximate annular recessed portion 244, and a recessed, tapered nose section 248, proximate threaded exterior portion 246 and surrounding central bore 240.

Fitting nut 214, like fitting body 212, is also preferably of a integral configuration, and incorporates an inner fitting portion 250. Inner fitting portion 250 of fitting nut 214 is preferably defined by a threaded inner portion 252, wherein the threads of threaded inner portion 252 are designed to interface with the threads of threaded exterior portion 246 of fitting body 212. Inner fitting portion 250 is further preferably defined by an intermediate wall portion 254 and a distal wall portion 256, both of which are generally planar surfaces. Intermediate wall portion 254 and distal wall portion 256 are joined by an extender section 258. As indicated previously, fitting nut 214 is further defined by a plurality of indicator windows configured as apertures 232, which are positioned above distal wall portion 256 and extend from extender section 258 through to end plate 230. Apertures 232 are of a diameter to accommodate prongs 234.

Torque confirmation portion 216 preferably includes a collar portion 270 and a plurality of prongs 234, which are preferably unitary with collar portion 270. Collar portion 270 is preferably defined by a substantially planar lower face 272 that surrounds an aperture 274 extending therethrough. Collar portion 270 is further preferably defined by an elongate side wall 276 and a shortened side wall 278. Elongate side wall 276 extends between lower face 272 and an upper face 280, which extends the length of prong 234. Shortended side wall 278 extends between lower face 272 and a lower surface 282 of prong 234. Thus, each of prongs 234 is preferably cylindrical in shape having rounded tip 235 and an upper point and lower point of the cylinder defined by upper face 280 and lower surface 282, respectively. Upon insertion of prong 234 through aperture 232, notch engaging portion 264 extends through the indicator window providing a visual indication of proper tightening.

The apertures have a diameter $d_1$ and the tip 235 of the prongs 234 have a diameter $d_2$ which may be appropriately sized with $d_1$ less than $d_2$ torque. The prongs 234 may have a locking means configured as an annular recess 235.1.

The predetermined torque of a fitting can be varied by selecting appropriately sized diameters $d_1$ and $d_2$.

In securing embodiment 200 of torque confirmation fitting 10 to tubing 236, the pre-flared end 285 of tubing 236 with the nut and torque confirmation portion thereon, is oriented facing tapered nose section 248 of fitting body 212 and is placed thereon. Fitting nut 214 is engaged with the fitting body 212 with the apertures 232 aligned with prongs 234 of torque confirmation portion 216. Fitting nut 214 is then preferably manually rotated such that the threads of fitting body 212 and fitting nut 214 act to axially draw fitting nut 214 towards outer ring portion 242 of fitting body 212.

As fitting nut 214 is drawn towards outer ring portion 242, prongs 234 are driven through apertures 232 of fitting nut 214. Simultaneously, collar 270 of torque confirmation portion 216 is acting to pinch the pre-flared end of tubing 136 to tapered nose section 248 of fitting body 212. Eventually, the drawing of fitting nut 214 towards fitting body 212 causes tip 235 of prong 234 to extend beyond end plate 230 out the indicator window providing a visual signal indicating to the user that fitting nut 214 has been tightened sufficiently to fitting body 212 such that a seal has been created between tapered nose section 248 of fitting body 212, the pre-flared end of tubing 236, and collar 270 of torque confirmation portion 216. Specifically, a pinch point has been created between tapered nose section 248, tubing 236, and collar 270 and effected a seal thereby.

It should be noted that the torque confirmation fittings 10 described herein may be utilized to secure pre-flared tubing or, alternatively, the torque features of the fittings 10 may be incorporated into a self-flaring fitting that is designed for use with non-flared tubing. Such self-flaring fittings are described in co-pending U.S. patent application Ser. No. 09/589,690, entitled "Self-Flaring Plastic Fittings" with the same inventors, the same filing date, and the same owner as the instant application. Said application is incorporated herein by reference.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed:

1. A combination plastic torque confirmation fitting and a section of plastic tubing with a flared end for coupling to the fitting, said fitting comprising:
   a fitting body having a nose section, wherein said nose section supports said section tubing;
   a torque confirmation portion; and
   a fitting nut operably joinable to said fitting body and engageable with said torque confirmation portion,
   wherein upon joining of said fitting nut to said fitting body with the torque confirmation portion and the flared end of the section of tubing therein, said fitting nut engages said torque confirmation portion and the continued joining of said fitting nut to said fitting body causes said torque confirmation portion to provide a visual indication when said fitting nut has been sufficiently tightly joined to said fitting body.

2. A plastic torque confirmation fitting for coupling a section of tubing to the fitting, said fitting comprising:
   a fitting body having a nose section, wherein said nose section supports said section of tubing;
   a torque confirmation portion wherein said torque confirmation portion includes a prong;
   a fitting nut operably joinable to said fitting body and engageable with said torque confirmation portion; and
   wherein upon insertion of said section of tubing through said torque confirmation portion and said fitting nut, and upon the joining of said fitting nut to said fitting body, said fitting nut engages said torque confirmation portion and the continued joining of said fitting nut to said fitting body causes said prong to provide a visual indication when said fitting nut has been sufficiently tightly joined to said fitting body.

3. The plastic torque confirmation portion of claim 2, wherein said torque confirmation portion includes a collar portion and wherein the continued joining of said fitting nut to said fitting body causes said collar portion to secure the supported section of tubing to said nose section of said fitting body.

4. The plastic torque confirmation fitting of claim 2, wherein said visual indication comprises said torque confirmation portion extending beyond a boundary of said fitting nut.

5. The plastic torque confirmation fitting of claim 2, wherein said prong is inserted through said fitting nut, when said fitting nut has been sufficiently tightened to said fitting body.

6. The plastic torque confirmation fitting of claim 5, wherein the prong is deflected radially by said fitting nut during the continued joining of said fitting nut to said fitting body.

7. The plastic torque confirmation portion of claim 2, wherein said prong is deflected by said fitting nut.

8. The plastic torque confirmation portion of claim 7, wherein said torque confirmation portion includes a collar portion and wherein said collar portion is provided with a notch enabling easier deflection of said prong.

9. The plastic torque confirmation portion of claim 2, wherein said torque confirmation portion provides an audible indication that said fitting nut has been sufficiently advanced upon to said fitting body.

10. A combination plastic torque confirmation fitting and a section of tubing with a flared end, said fitting comprising:
    a fitting body having a nose section, wherein said nose section supports said section tubing;
    a torque confirmation portion, wherein said torque confirmation portion includes a prong;
    a fitting nut operably joinable to said fitting body and engageable with said torque confirmation portion,
    wherein upon joining of said fitting nut to said fitting body with the torque confirmation portion and the flared end of the section of tubing therein, said fitting nut engages said torque confirmation portion and the continued joining of said fitting nut to said fitting body causes said torque confirmation portion to provide a visual indication when said fitting nut has been sufficiently tightly joined to said the fitting body.

11. A combination plastic torque confirmation fitting and a section of tubing with a flared end, said fitting comprising:
    a fitting body having a nose section, wherein said nose section supports said section tubing;
    a torque confirmation portion wherein said torque confirmation portion includes a prong;
    a fitting nut operably joinable to said fitting body and engageable with said torque confirmation portion,
    wherein upon joining of said fitting nut to said fitting body with the torque confirmation portion and the flared end of the section of tubing therein, said fitting nut engages said torque confirmation portion and the continued joining of said fitting nut to said fitting body causes said torque confirmation portion to provide an audible indication when said fitting nut has been sufficiently tightly joined to said fitting body.

12. A plastic torque confirmation fitting for coupling a first material transfer means to a second material transfer means, said first and second material transfer means for providing a passageway for flowing material, said plastic torque confirmation fitting comprising:
    first coupling means for coupling said first material transfer means to said second material transfer means, said first coupling means including support means for supporting a portion of said first material transfer means;
    second coupling means for joining said first coupling means for engaging said torque confirmation means upon joining said second coupling means; and
    torque confirmation means for providing a visual indication that a desired torque has been achieved between said first coupling means and said second coupling means upon said second coupling means joining said first coupling means, wherein said visual indication is provided by a projecting means which project around said second coupling means.

13. A plastic torque confirmation fitting for coupling a first material transfer means to a second material transfer means, said first and second material transfer means for providing a passageway for flowing material, said plastic torque confirmation fitting comprising:
    first coupling means for coupling said first material transfer means to said second material transfer means, said first coupling means including support means for supporting a portion of said first material transfer means;
    second coupling means for joining said first coupling means for engaging said torque confirmation means upon joining said second coupling means;

torque confirmation means for providing an audible indication that a desired torque has been achieved between said first coupling means and said second coupling means upon said second coupling means joining said first coupling means.

14. A method of coupling a section of tubing to a plastic torque confirmation fitting, wherein said fitting has a fitting body, a fitting nut, and a torque confirmation portion, the method comprising the steps of:

sliding said torque confirmation portion over the end of said section of tubing;

sliding said fitting nut over the end of said section of tubing;

flaring the end of the section of tubing;

supporting the flared section of tubing with said fitting body;

joining said fitting nut to said fitting body, wherein the joining draws said fitting nut onto said fitting body and causes said fitting nut to interface with said torque confirmation portion; and providing a visual indication with said torque confirmation portion that said fitting nut has been sufficiently tightly joined to said fitting body.

15. A method of coupling a section of tubing to a plastic torque confirmation fitting, wherein said fitting has a fitting body, a fitting nut, and a torque confirmation portion, the method comprising the steps of:

sliding said torque confirmation portion over the end of said section of tubing;

sliding said fitting nut over the end of said section of tubing;

supporting the end of the section of tubing with said fitting body;

joining said fitting nut to said fitting body, wherein the joining draws said fitting nut onto said fitting body and causes said fitting nut to interface with said torque confirmation portion; and providing an audible indication with said torque confirmation portion, comprised of a snapping of the prong, that said fitting nut has been sufficiently tightly joined to said fitting body.

16. A method of coupling a section of tubing to a fitting with a plastic torque confirmation fitting, wherein said fitting has a fitting body, a fitting nut, and a torque confirmation portion, the method comprising the steps of:

sliding said torque confirmation portion over the end of said section of tubing;

sliding said fitting nut over the end of said section of tubing;

supporting the flared section of tubing with said fitting body;

joining said fitting nut to said fitting body, wherein the joining draws said fitting nut onto said fitting body and causes said fitting nut to interface with said torque confirmation portion; and providing a visual indication with said torque confirmation portion comprised of a prong, that said fitting nut has been sufficiently tightly joined to said fitting body by said prong extending beyond a boundary of said fitting nut.

17. The method of claim 16, wherein said prong is inserted through said fitting nut.

18. The method of claim 16, wherein said prong is deflected by said fitting nut.

19. A method of coupling a section of tubing with a flared end to a plastic torque confirmation fitting, wherein said fitting has a fitting body, a fitting nut, and a torque confirmation portion, the method comprising the steps of:

sliding said torque confirmation portion over the end of said section of tubing;

sliding said fitting nut over the end of said section of tubing;

flaring the end of the section of tubing;

supporting one end of one section of tubing with said fitting body;

joining said fitting nut to said fitting body, wherein the joining draws said fitting nut onto said fitting body and causes said fitting nut to interface with said torque confirmation portion;

providing a visual indication with said torque confirmation portion comprised of a prong, that said fitting nut has been sufficiently tightly joined to said fitting body by said prong extending beyond a boundary of said fitting nut.

20. A method of coupling a section of tubing with a flared end to a plastic torque confirmation fitting, wherein said fitting has a fitting body, a fitting nut, and a torque confirmation portion, the method comprising the steps of:

sliding said torque confirmation portion over the end of said section of tubing;

sliding said fitting nut over the end of said section of tubing;

flaring the end of the section of tubing;

supporting the flared section of tubing with said fitting body;

joining said fitting nut to said fitting body, wherein the joining draws said fitting nut onto said fitting body and causes said fitting nut to interface with said torque confirmation portion; and providing an audible indication with said torque confirmation portion, comprised of a snapping of the prong, that said fitting nut has been sufficiently tightly joined to said fitting body.

* * * * *